(No Model.) 2 Sheets—Sheet 2.

W. B. QUICK.
Sulky-Plow.

No. 228,676. Patented June 8, 1880.

WITNESSES
Fred L. Ditterich
Albert W. Krause

William B. Quick
INVENTOR
by Louis Bagger & Co.
ATTORNEYS

N. PETERS, PHOTO-LITHOGRAPHER, WASHINGTON, D. C.

UNITED STATES PATENT OFFICE.

WILLIAM B. QUICK, OF WYANDOTTE, KANSAS, ASSIGNOR TO REUBEN W. FISHBORN AND HENRY HAFNER, OF SAME PLACE, ONE-THIRD TO EACH.

SULKY-PLOW.

SPECIFICATION forming part of Letters Patent No. 228,676, dated June 8, 1880.

Application filed April 20, 1880. (No model.)

*To all whom it may concern:*

Be it known that I, WILLIAM B. QUICK, of Wyandotte, in the county of Wyandotte and State of Kansas, have invented certain new and useful Improvements in Sulky-Plows; and I do hereby declare that the following is a full, clear, and exact description of the invention, which will enable others skilled in the art to which it appertains to make and use the same, reference being had to the accompanying drawings, which form a part of this specification, and in which—

Figure 1:
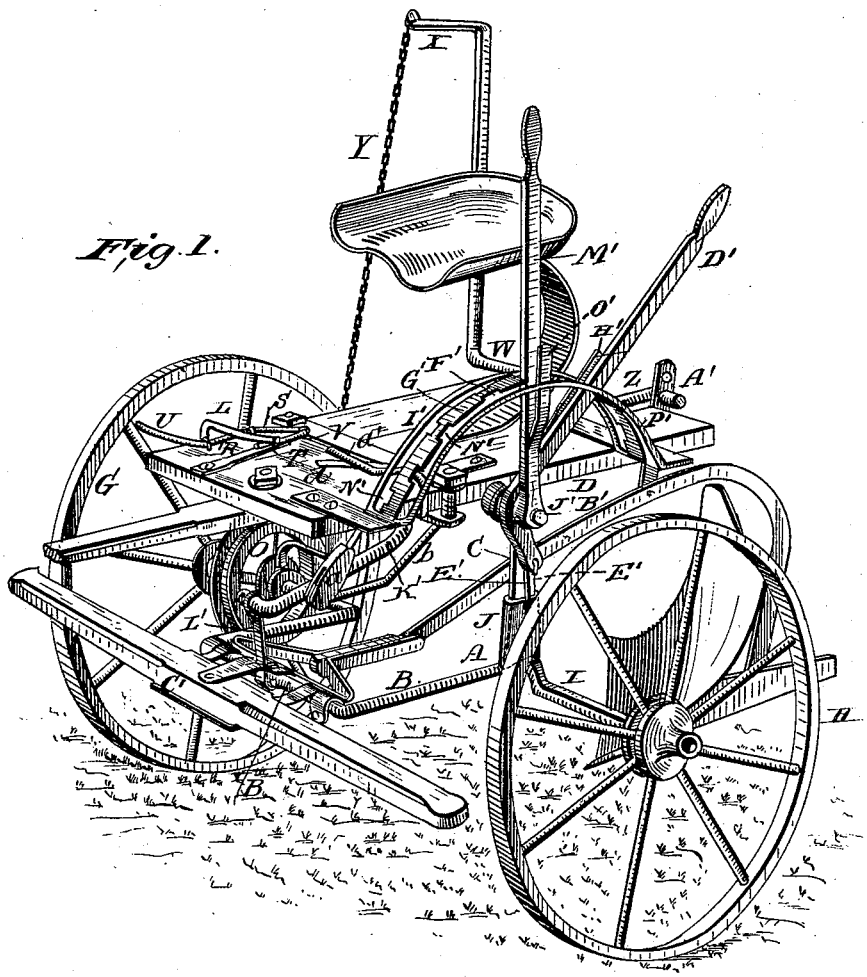
Figure 2:
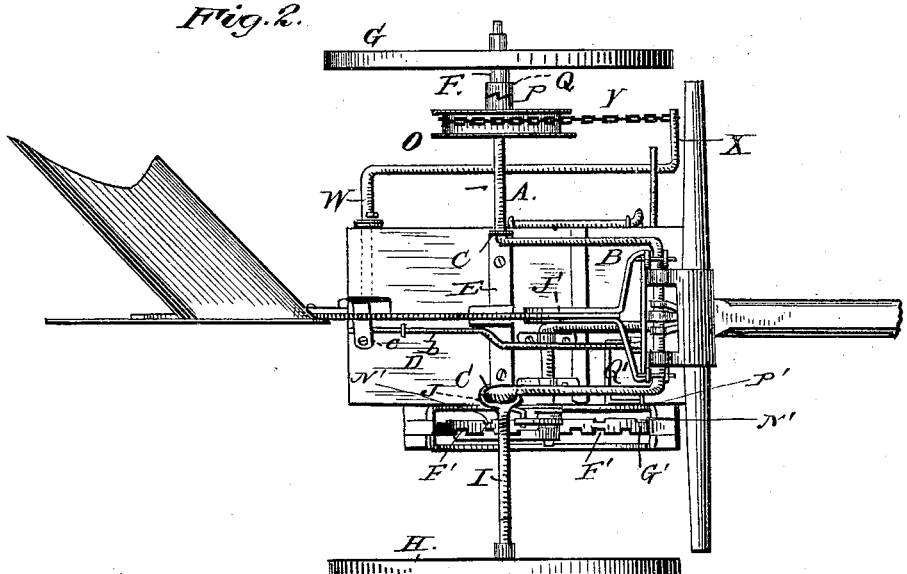
Figure 3:
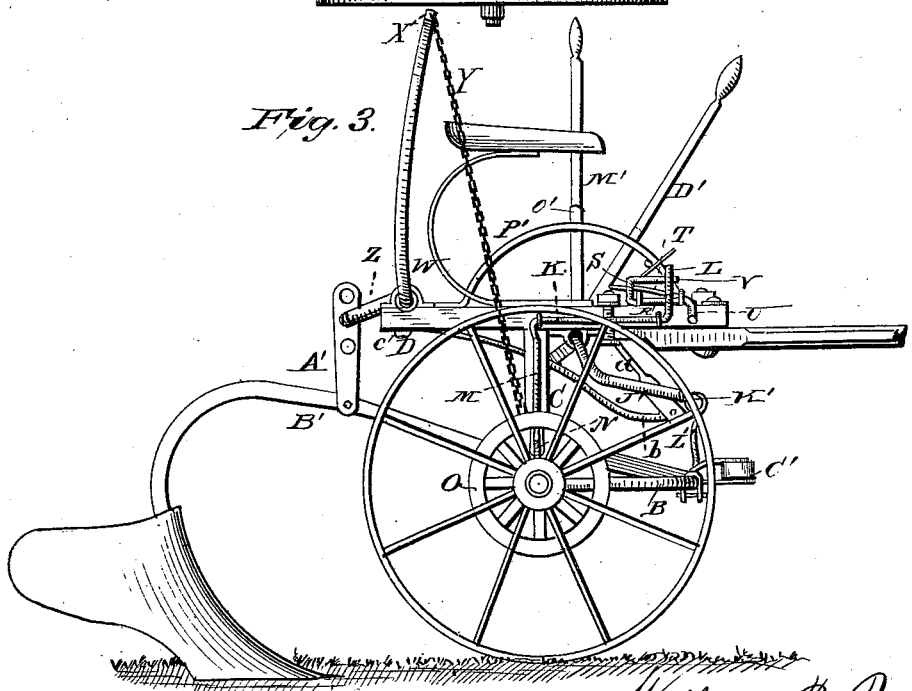

Figure 1 is a perspective view. Fig. 2 is a bottom plan, and Fig. 3 is a side view.
Corresponding parts in the several figures are denoted by like letters of reference.

This invention relates to sulky-plows; and it consists in certain improvements in the construction of the same, which will be hereinafter fully described, and particularly pointed out in the claims.

Referring to the drawings hereto annexed, A represents the axle, which is shaped with a forwardly-extending bail, B, at the ends of which are arranged pivoted uprights C C, supporting a platform, D, which rests upon a cross-piece, E, connecting said uprights, or formed in a piece therewith. One of the arms F of the axle forms the spindle for the wheel G. The other wheel, H, is journaled upon a stub-axle, I, provided at its inner end with a sleeve, J, by which it slides vertically upon one of the uprights C. In other words, the axle is broken off at one end of the bail or tongue B, where it terminates in the upright C, upon which sleeve J is inserted and slides, the stub-axle I, carrying the wheel H, being bolted or otherwise secured rigidly upon said sleeve so as to move with it.
The side of platform D adjoining the wheel G is provided with bearings for a rock-shaft, K, having at its front end an arm, L, projecting inward over the platform D, and at its rear end a downward-projecting arm, M. The lower end of the latter is provided with a pivoted rod, N, having at its outer end a ring or band fitted in a groove in the hub of a grooved wheel, O, adapted to slide upon the arm F of the axle. Upon the outside of the hub of wheel O is formed a clutch, P, adapted to engage a corresponding clutch, Q, upon the inner side of the hub of wheel G, with which it may, therefore, be caused to revolve.

Arranged in suitable bearings upon platform D, closely beside rock-shaft K, is another rock-shaft, R, provided at its rear end with an inward-projecting arm, S, supported upon a spring, T, and at its front end with an outward-projecting arm, U. The arm S is provided with a forward projection, V, supporting the arm or lever L of rock-shaft K, which thus, by the tension of spring T, is operated, with its attachments, to keep the grooved wheel O automatically disengaged from the transporting-wheel G.

W is a rock-shaft, journaled transversely upon platform D, at the rear end of the latter. It has at its outer end a projecting arm, X, the outer end of which is connected by a chain or rope, Y, with the periphery of the grooved wheel O. At its inner end the shaft W is provided with a crank, Z, connected by a pivoted rod, A', with the plow-beam B', the front end of which latter is pivoted upon the bail B of the axle, upon which the double-tree or equalizer C' is also pivoted, as shown.

The wheel H is capable of vertical adjustment by a bent lever, D', pivoted to the side of platform D, and having its lower short arm connected to the sleeve J by a pivoted rod, E'. To retain it in any desired position the upper arm or handle of the lever D' is adapted to enter any one of a series of notches, F', in a curved bar, G', secured upon platform D, the side of the lever being provided with a spring, H', pressing against a curved rod, I', to retain the said lever-handle in the notch in which it may be adjusted.

J' is a rock-shaft located in suitable bearings transversely under the platform D, and provided with a crank, K', connected by a pivoted rod, L', with the bail B, which thus, by operating the rock-shaft J', may be raised or lowered, thereby gaging the depth of the plow, the front end of the beam of which is connected, as already stated, to the said bail.

Rock-shaft J' is operated by a lever, M', which, to retain it in any desired position, may be adjusted in any one of a series of notches, N', in the curved bar G'. To retain the lever

M′ in the said notches, a spring, O′, pressing against a curved rod, P′, is employed.

Q′ is a short rock-shaft arranged transversely under the platform D, and provided at its inner end with a downward-projecting arm, a, in the lower end of which is pivoted a bent rod, b, which extends rearwardly under platform D, parallel with its sides, out through a keeper, c, at the rear end of the platform, and over the crank Z. This rod b is manipulated by depressing an arm, a′, of the rock-shaft Q′, which extends laterally up over the platform, and is kept in an elevated position by a spring, d, placed under it.

Under ordinary circumstances, when lever Q′ a′ is in its raised or elevated position, (caused by the tension of spring d,) rod b does not project beyond the rear end of the platform; but when the arm or treadle a′ is depressed by the driver placing his foot upon it the rear end of rod b will project back of the platform, for the purpose hereinafter stated.

The arm or link A′, which connects rock-shaft W with the plow-beam B′, has a series of perforations for the adjustable attachment of the crank Z of said rock-shaft, by means of which the pitch of the plow may be adjusted prior to commencing the operation of plowing.

When it is desired to change the pitch while in the field, this is accomplished by operating lever M′ and rock-shaft J′, which raises or lowers the front end of the plow-beam in the manner already described by adjusting the elevation of the forwardly-projecting bail B of the axle.

By depressing the arm or lever L of the rock-shaft K the downwardly-projecting arm M of said rock-shaft is forced outwardly from the platform, thus, by means of the intermediate hinged connecting-rod N, coupling the clutch of the grooved wheel or pulley O to that of the drive-wheel G, and causing it to revolve with it, which winds up the chain and draws down lever X, thereby lifting the plow out of the ground. When lever X strikes the outer end or arm, U, of rock-shaft R the sliding wheel O is unshipped from the drive-wheel and ceases to revolve, while the plow and plow-beam will remain in their elevated position. To again set the plow in the ground it is only necessary to make a quick or sudden pressure on arm V, which throws lever X up and drops the plow to the ground. If the ground is hard and the plow-point liable to slip out, it is held down by depressing the treadle a′, which throws the rear end of rod b out over the crank Z of rock-shaft W and locks it in place.

If the plow is used on hill-sides or other uneven ground, wheel H may be adjusted up or down by operating lever D′, as already described.

Having thus described my invention, I claim and desire to secure by Letters Patent of the United States—

1. In a sulky-plow, the combination of platform D, axle A, made with a forwardly-extending bail or tongue, B, and spindle F, drive-wheel G, journaled upon said spindle and provided with the concentric clutch Q, grooved wheel O, sliding upon the axle and provided with the concentric clutch P, connecting-chain Y, rock-shaft W, provided with the arms X Z, connecting-link A′, and hinged plow-beam B′, substantially as and for the purpose herein shown and specified.

2. In combination with the hinged and vertically-adjustable plow-beam B′, link A′, and rock-shaft W, having arms Z X, for operating the same, the sliding bolt or lock-bar b, with its operating mechanism, composed of the rock-shaft Q′, having arms a a′ and spring d, substantially as and for the purpose herein shown and described.

In testimony that I claim the foregoing as my own I have hereto affixed my signature in presence of two witnesses.

WILLIAM B. QUICK.

Witnesses:
JAMES M. MASON,
DAVID M. SMITH.